Patented May 26, 1931

1,807,483

UNITED STATES PATENT OFFICE

WILLIAM BURNS LOGAN, OF DE QUINCY, LOUISIANA, ASSIGNOR TO THE NEWPORT COMPANY, OF CARROLLVILLE, WISCONSIN, A CORPORATION OF DELAWARE

TREATMENT OF ROSIN AND PRODUCT THEREOF

No Drawing. Application filed January 3, 1929. Serial No. 330,157.

The present invention relates to improving the qualities of rosin, the invention being applicable to both gum rosin and wood rosin or rosin obtained in any other manner. The term "rosin" is hereinafter used in that sense.

Rosin, obtained by any of the known methods, consists essentially of abietic acid or its anhydrides. Several methods have been proposed for removing the color from rosin, since the lighter colored rosin brings a higher price than the dark colored rosin, other properties of the rosin being the same. Among such methods I will mention the treatment of a solution of rosin in naphtha or other similar solvent, with fuller's earth or other bleaching clays or other bleaching agents, by which some of the color bodies are removed, also the distillation of rosin under vacuum or in a current of superheated steam or inert gases, or the treatment of rosin with certain differential solvents for separating the color bodies, or the precipitation of the color bodies from solution of the rosin, by treatment with certain inorganic halides, stannic chloride being particularly mentioned. This latter mode of removing the color from rosin forms the subject matter of a separate application filed by me, Serial Number 297,110, filed August 2, 1928.

The vacuum distillation of rosin has been described in U. S. patent to Donk, Number 1,219,413, of March 13, 1917. Although this patent was dedicated to the public, it has not, so far as I am advised, come into extended use among rosin refiners, probably on account of the fact that the distilled rosin possesses a very undesirable crystallizing property, in that the rosin will crystallize either from solution or from the molten state, and this property is also inherent, to a greater or less extent in all of the bleached or decolorized rosins produced by the other processes above alluded to.

My researches have also disclosed that there are several color bodies present in wood rosin, some of which exhibit color in the natural (or acid) condition of the rosin, and others of which (or at least one other of which) do not exhibit color in the original or acid condition of the rosin, but develops this color upon solution of the wood rosin in an alkali and subsequent treatment with aluminum salts. On account of this fact, even when a light colored wood rosin is dissolved in alkali solution, for example in the making of rosin size for treating paper pulp in the beater engine, and the rosin soap is treated with alum or other aluminum compound to precipitate the size, there is developed a yellowish or brownish color which attaches itself to the paper, which of course is objectionable in the formation of very light colored or white paper.

This latter body is hereinafter referred to as "potential color body". It has no color of itself, but develops color on solution and subsequent precipitation with aluminum salts.

This potential color body is not to be confused with certain other latent color bodies which develop their color upon solution of the rosin in an alkali and allowing to stand in open air. The latter bodies develop a yellowish color in alkaline medium and in the presence of an oxidizing agent (air). The potential color bodies with which this specification is concerned, develop on the precipitate after neutralization of the alkaline solution with aluminum salts.

This particular color body which causes the yellow tinge when the wood rosin is used as a size on white paper, is the most difficult to remove by the hitherto known methods. It is possible to remove a large portion of it by means of large proportions of certain differential solvents, but in doing so, there is a large portion of the light colored rosin lost on the removal of the color bodies and potential color body, and this tends to make the process commercially unattractive. It is also possible to remove all of this undesirable color body by using large percentages of stannic chloride, but the cost of recovering such large quantities of stannic chloride considerably increases the cost of operating such a process.

In my U. S. Patent Number 1,643,276, of Sept. 20, 1927, I have described a process of treating wood rosin to remove its tendency to crystallize, said methods involving the heating of the rosin for various periods of time ranging from 10 minutes to several hours at temperatures ranging between 260 and 325° C. I have now found that such a heating operation on wood rosin, which has been bleached or decolorized by differential solvents or by stannic chlorid or the like, produces another highly useful effect, in that it destroys the particular color the particular body which is responsible for the yellowish or brownish color which develops when the rosin is dissolved in alkali to form a paper size and subsequently precipitated on the paper with aluminum salts.

A further effect of such heat treatment on bleached or decolorized rosin is to remove further quantities of the visible coloring matter, and thereby increase the refinement of the rosin. Thus, for instance, if the original grade of the rosin was I or K, heat treatment according to this invention changes it to N; if the original grade was M, this heat treatment advances it to WG; a grade N is advanced to the finest grades known today, namely WW or X.

Based on the foregoing discoveries, the present invention consists in removing the visible color bodies from rosin (wood or gum) by any of the known methods, such as treatment with fuller's earth, distillation, fractional solution or fractional precipitation by stannic chloride or other inorganic halides, in conjunction with the heat treatment substantially as set forth in my prior Patent 1,643,276, the latter operation also removing the "potential color body" by which term I mean that color body (one or several) present in (wood) rosin which will develop color on use of this in sizing. The following are several different modes of applying the present invention, these being applicable both to wood rosin and gum rosin.

(a) The original rosin is first distilled in a vacuum according to any well known process, using either a continuous still or a pot still, and is then subjected to heat treatment say at 260° C. for about 8 hours or at 300° C. for about 2 hours, or preferably at an intermediate temperature, say 280° C., for an intermediate period of time. This mode of treatment is to be preferred to a process involving the same steps in reverse order.

(b) The original gum or wood rosin is first treated (in solution in naphtha or other solvent) with stannic chloride or other inorganic halide for precipitating and separating the visible color bodies, and then this light colored rosin (after distilling off the solvent) is subjected to a heat treatment at a temperature of approximately 260° C., for approximately 8 hours, or 300° C for approximately 2 hours, whereby its tendency to crystallize is very greatly reduced, and whereby (in wood rosin) the "potential color body" is destroyed.

(c) The original rosin is first treated by the fractional solution method above referred to, and is then after the major part of the observable color has been removed, subjected to the heat treatment at 260 to 300° C., as above indicated, whereby its tendency to crystallize is greatly reduced and whereby (in wood rosin) the potential color body is destroyed.

The specific procedures described under (a), (b) and (c) above may be extended to rosin bleached by any other well known method, say, by treatment with fuller's earth.

I have above referred to the heat treatment of the rosin at 260° C., for eight hours, or at 300° C., for two hours. The time varies inversely as the temperature. To get the most complete destruction of the "potential color body" I preferably carry the heat to 280° C. or higher.

Gum rosin on the market may vary considerably in respect to its optical rotation, usually being between about +7 and +20 (for the undistilled product).

The optical rotation of the rosin, as determined by testing in a solution in naphtha, as I have found, and as explained in my prior patent, furnishes a guide to the tendency to crystallization. If the optical rotation, so tested, is +20 or more, then the tendency to crystallize is small. If this is as high as +25, the tendency to crystallize is practically nil.

I am able to test my process, to determine the degree of completion, by making tests of the optical rotation, samples of the material undergoing treatment being withdrawn from time to time, and this test applied. When a test shows the specific rotation to be +20 and +25 or better, the entire batch is run out of the kettle and cooled, preferably being cooled rapidly as by circulating cold water through jackets or coils, etc. In this manner I am able to eliminate undesirable crystallization of the rosin. It is readily possible, by my process to bring the optical rotation of a good gum rosin (whether or not it has been distilled in vacuum) up to +25 or even to +32. For most purposes +25 or better is very satisfactory.

The above discussion and tests apply equally to wood rosin, except of course that the numerical limits are different. Thus when a bleached wood rosin has been heat treated according to this invention until its optical rotation is above +10, say +10 to +15, the potential color bodies therein have been practically reduced to zero. Again, when with the same sample the heat treatment is continued until the optical rotation is above +30, say +40 or better, the sample will be found to exhibit the further advantage of having very little tendency to crystallize. The improvement as to visible color, mentioned above, goes hand-in-hand with the improvement as to potential color bodies. In other words, at an optical rotation of about +10 to +15, the decrease in color is already very remarkable.

All the above limits as to optical rotation, fall within the time and temperature ranges specified above, or in my previous patent above referred to (No. 1,643,276).

In accordance with the present invention there is produced what is believed to be an absolutely new product, namely, bleached or decolorized wood rosin (or very light colored wood rosin) which is free from any important tendency to crystallize and which rosin, during solution in alkali and precipitation with aluminum compounds, does not develop yellowish or brownish color in the sizing. The terms "bleaching" and "decolorizing" of course include removal of all the color or a substantial portion of the color.

The bleaching of wood rosin by the vacuum distillation method, or distillation in a current of inert gas or vapor, will not wholly remove the potential color body mentioned.

The bleaching of wood rosin by differential solvents or by stannic chlorid can be so conducted as to remove all (or at least most) of the potential color body, but this causes a great loss of relatively light colored rosin, and in the latter case would necessitate the recovery of unduly large amounts of stannic chlorid. Accordingly when using these modes of treatment, I preferably carry the treatment only to the stage of removing all or most of the visible color bodies, then evaporate the solvent and heat to 260 to 300° C. and preferably to over 280° C., in the manner stated above. Of these bleaching processes I prefer the stannic chlorid treatment.

I call attention to the fact that relatively light colored gum rosin (which has not been subjected to any bleaching treatment) ordinarily would not have a very great tendency to crystallization since it will have had no strong heat treatment. Such a rosin if subjected to any of the bleaching processes, as above referred to, to further improve its color, would have a very great tendency toward crystallization. This tendency toward crystallization renders the product less suitable for many of its uses. All of the cheaper grades of gum rosin would be improved by bleaching and treatment by the process of Logan Patent 1,643,276, by giving a light colored rosin free from crystallization tendency, thereby considerably improving such rosin for many of its uses.

In the claims below it shall be understood that by the term "bleached" we means to include rosin whose visible color has been reduced by any of the well known methods, such as distillation, extraction with differential solvents, treatment with inorganic salts, or filtration through fuller's earth. Also, by the term "heat-treated" we are referring to a rosin which has been subjected to a temperature of about 260 to 325° C. for a period of time ranging from 8 hours to 10 minutes, without substantial distillation thereof.

I claim:—

1. The process of improving wood rosin which comprises heating a bleached grade of the same at a temperature below that at which substantial decomposition sets in and without material distillation thereof, until its content of potential color body has been considerably reduced.

2. The process of improving rosin which comprises heating a bleached grade of the same at a temperature below that at which substantial decomposition sets in and without material distillation thereof, until its tendency to crystallize from solution has been considerably reduced.

3. The process of improving the qualities of wood rosin for the purpose of adapting it for the preparation of paper size, which comprises subjecting a bleached grade of the same to heat treatment at a temperature below that at which substantial decomposition sets in and without material distillation thereof, until the substantial destruction of its potential color.

4. The process of improving the qualities of rosin for the purpose of adapting it for the preparation of paper size, which comprises subjecting a bleached grade of the same to heat treatment at a temperature below its decomposition point and without material distillation thereof, until the substantial destruction of its tendency to crystallize from solution.

5. The process of improving rosin, which comprises heating a bleached grade of the same at a temperature between 260 and 325° C. and without material distillation thereof for a period of time between 8 hours and 10 minutes until the potential color bodies are considerably reduced.

6. The process of improving rosin, which comprises heating a bleached grade of the same, at a temperature between 260 and 325° C. and without material distillation thereof for a period of time between 8 hours and 10 minutes until the tendency to crystallize has been considerably reduced.

7. The process of improving rosin which comprises heating a bleached grade of the same at a temperature of between 260 to 325° C. and without material distillation thereof until its optical rotation has substantially increased.

8. The process of improving rosin which comprises heating a bleached grade of the same at a temperature of between 260 and 325° C. and without material distillation thereof until its optical rotation has become at least +20.

9. The process of improving rosin which comprises heating a bleached grade of the same at a temperature of between 260 and 325° C. and without material distillation thereof until its optical rotation has reached at least +25.

10. The process of improving rosin which comprises heating a bleached grade of the same at a temperature of between 260 and 325° C. and without material distillation thereof until its optical rotation has reached at least +32.

11. As a new product, a heat treated bleached wood rosin having substantially no tendency to develop yellowish color upon solution in alkali and subsequent treatment with aluminum salts.

12. As a new product, a bleached rosin having an optical rotation higher than +20.

13. As a new product, a bleached rosin having an optical rotation higher than +25.

14. As a new product, a bleached rosin having an optical rotation at least as high as +32.

WILLIAM BURNS LOGAN.